US006792392B1

(12) United States Patent
Knight

(10) Patent No.: US 6,792,392 B1
(45) Date of Patent: Sep. 14, 2004

(54) METHOD AND APPARATUS FOR CONFIGURING AND COLLECTING PERFORMANCE COUNTER DATA

(75) Inventor: Robert P. Knight, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 526 days.

(21) Appl. No.: 09/607,254

(22) Filed: Jun. 30, 2000

(51) Int. Cl.[7] .............................................. H02H 3/05
(52) U.S. Cl. ........................ 702/186; 702/69; 702/78; 702/79; 702/80; 702/182
(58) Field of Search ..................... 702/186, 69, 78–80, 702/117–126, 177–188, FOR 103–104, FOR 109–110, FOR 134–135, FOR 170–171; 714/47, 25, 30, 35, 37–39, 43, 45, 733; 709/331, 327

(56) References Cited

U.S. PATENT DOCUMENTS

| | | | | |
|---|---|---|---|---|
| 4,872,121 A | * | 10/1989 | Chan et al. | 702/182 |
| 5,485,574 A | * | 1/1996 | Bolosky et al. | 714/35 |
| 5,557,548 A | * | 9/1996 | Gover et al. | 702/176 |
| 5,581,482 A | * | 12/1996 | Wiedenman et al. | 702/186 |
| 5,657,253 A | * | 8/1997 | Dreyer et al. | 702/186 |
| 5,796,637 A | * | 8/1998 | Glew et al. | 702/190 |
| 5,881,223 A | * | 3/1999 | Agrawal et al. | 714/47 |
| 6,098,169 A | * | 8/2000 | Ranganathan | 712/227 |
| 6,112,318 A | * | 8/2000 | Jouppi et al. | 714/47 |
| 6,233,531 B1 | * | 5/2001 | Klassen et al. | 702/80 |
| 6,279,124 B1 | * | 8/2001 | Brouwer et al. | 714/38 |
| 6,493,837 B1 | * | 12/2002 | Pang et al. | 714/45 |
| 2002/0073255 A1 | * | 6/2002 | Davidson et al. | 710/104 |
| 2002/0194389 A1 | * | 12/2002 | Worley et al. | 709/310 |

OTHER PUBLICATIONS

Anderson, "Your Right to Know; Finding Leaks and Bottlenecks with a Windows NT Perfmon COM Object", Jan. 1999, Microsoft Corporation.*
Pratschner, "Instrumenting Windows NT Applications with Performance Monitor", Sep. 30, 1997, Microsoft Consulting Services.*
C. Aubley, "Windows 2000 Performance Tools", Apr. 1, 2000, Windows & .NET Magazine, www.winnetmag.com/Articles/Print.cfm?ArticleID=8198.*
K. Safford, "A Framework for Using the Pentium's Performance Monitoring Hardware", 1997, University of Illinois.*
"Windows 2000 Standard EXE files and Associated DII's", www.labmice.net/articles/standardexe.htm.*
"Supplementing Windows 95 and Windows 98 Performance Data for Remote Measurement and Capacity Planning", BonAmi Software Corporation, 1998.*
S. Patterson, "API Calls to Help You Optimize", Jan. 1996, Visual Basic Programmer's Journal.*

* cited by examiner

Primary Examiner—Marc S. Hoff
Assistant Examiner—Carol S Tsai
(74) Attorney, Agent, or Firm—Blakely, Sokoloff, Taylor & Zafman LLP

(57) ABSTRACT

A system and method are described for configuring and collecting performance counter information of a computer system. The method includes providing one or more performance objects, each object containing a predetermined set of events. A user is allowed to select the entire set or a subset of events to be monitored during a collection session from the predetermined set of events contained in the performance objects. The performance counters associated with the subset of events selected are programmed to increment in response to an occurrence of a respective event. The data stored in each of the performance counters associated with the subset of events selected is periodically read during the collection session.

23 Claims, 5 Drawing Sheets

METHOD AND APPARATUS FOR CONFIGURING AND COLLECTING PERFORMANCE COUNTER DATA

BACKGROUND OF THE INVENTION

1. Field of the Invention

The present invention generally relates to computer systems, and in particular, to a method and apparatus for collecting hardware performance counter data.

2. Description of the Related Art

Hardware and software developers use information collected by a performance-monitoring tool to better understand how hardware components within a computer system operate with the operating system kernel and application programs. For example, hardware component designers may use the performance-monitoring tool to monitor a hardware component's performance so that the data collected thereby may be used to drive optimization of the component's design. Similarly, software developers may use the information provided by the performance-monitoring tool to develop software code that utilizes various components within a computer system more efficiently.

Typically, performance counters are used to monitor the performance of a computer system. The performance counters are implemented as registers in hardware components and variables in software codes and are used to count the number of occurrences of a particular event, such as for example, to count the number of cache misses. By monitoring the performance counters, hardware and software developers can better understand the dynamics of the computer system to allow development of hardware components and software codes that utilizes the computer system platform more efficiently.

Currently, there is no effective way in which the performance counters residing in hardware components are monitored. For example, the preexisting performance-monitoring tools do not allow a user to selectively choose which hardware performance counters are to be monitored. In the preexisting performance-monitoring tools, all performance counters within a performance object are collected during the performance-monitoring tool's periodic call to collect data. Consequently, if a performance object contains a number of performance counters (e.g., ten performance counters), all performance counters within the performance object must be monitored even if information with regard to only one performance counter is needed. Moreover, the preexisting performance-monitoring tools do not allow a user to selectively customize the collection of performance counter data.

Therefore, there is a need to provide a performance-monitoring tool, which allows a user to select performance counters to be monitored and to customize their collection.

DETAILED DESCRIPTION OF THE INVENTION

Figure 1:
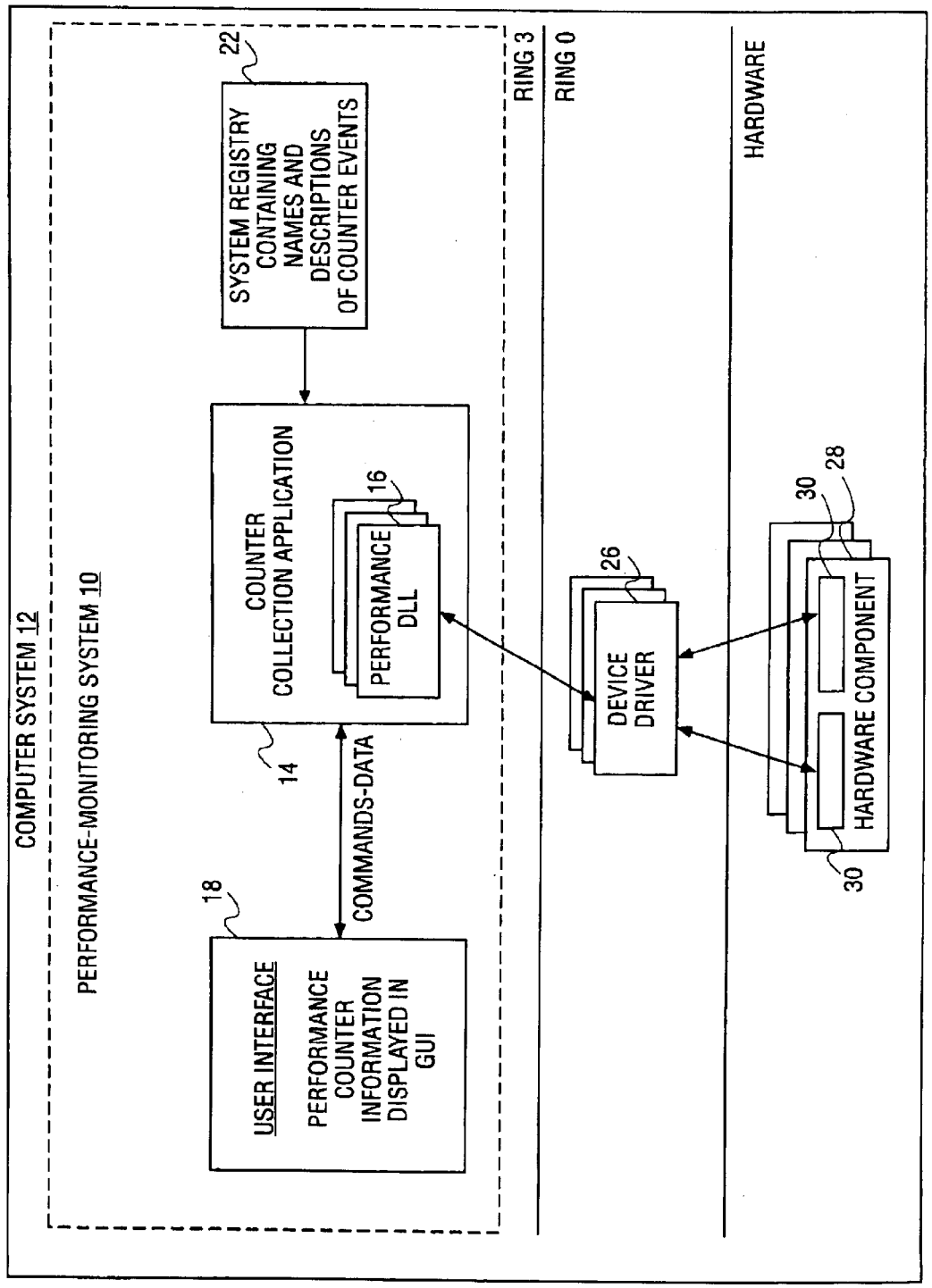
FIG. 1 is a block diagram of a performance monitoring system in a computer system in accordance with one embodiment of the present invention.

FIG. 1 is a block diagram of a performance-monitoring system 10 operating within a computer system 12 in accordance with one embodiment of the present invention. The performance-monitoring system 10 generally includes a counter collection application (CCA) 14 and a user interface 18 for allowing user interaction with the CCA. The CCA 14 is operable within a computer system (e.g., personal computer, workstation, mainframe and the like) having a number of device drivers 26 coupled to various hardware components 28. Loaded within the CCA 14 are one or more performance dynamic link libraries (performance DLLs) 16. The performance DLLs 16 are developed (by hardware and software developers) based on a set of application programming interfaces (performance DLL APIs) defined by this invention. As shown in FIG. 1, the CCA 14 reads a system registry 22 to retrieve the names and descriptions of each counter event supported by the performance DLLs.

When a developer decides to track performance counters in a subsystem of the computer system, a performance DLL 16 may be developed for the purposes of monitoring performance counters residing in the subsystem (e.g., hardware component or software program). In general, the performance counters in hardware components are programmable to allow monitoring of any one independent "event" selected from a predetermined list of counter events. The programmable performance counters will be described more in detail below with reference to FIG. 2.

It should be noted that the term "event" and "counter event" in the context of the present invention are used to describe some particular activity occurring in a hardware component or a software code. In a hardware component, an "event" or a "counter event" can take the form of a logic signal or other electrical signal that indicates an occurrence or duration of some particular activity. For example, the events to be counted by a performance counter in a hardware component may include any activity such as cache misses, cache hits, clock pulses, etc. In a software program, an "event" or a "counter event" can take the form of any action, activity or occurrence to which the program has access. For example, the event to be counted by a performance counter (e.g., variable) in a software code may include any activity such as throughput of bytes to and from a server application.

Performance DLLs 16 are libraries that are loaded when the CCA 14 is started and serve as a bridge between the CCA 14 and performance counters 30 that reside somewhere else in the computer system. Provided within the performance DLL 16 is a set of structures that define each performance counter that the performance DLL has the ability to monitor. In order to have the ability to read and program performance counters 30 that reside in external subsystems, the performance DLL also has knowledge about how to communicate with the external subsystems (e.g., hardware component or software code) via a device driver 26 or other interprocess communication (IPC) mechanism.

The developer may add an entry in the system registry 22 that describes their performance DLL 16. The developer may also add name and description entries into the system registry that describes each of the performance counter events supported by the performance DLL. When the CCA 14 is started, it examines the system registry 22 to find performance DLLs registered on the computer system and loads them. The CCA 14 also reads the names of the performance objects and performance counter events from the system register 22 and later matches them with the data collected from the performance DLL. Each performance DLL 16 is capable of supporting one or more performance objects. Performance objects are used to organize performance counter events wherein each object supports a set of performance counter events. The performance DLLs developed in accordance with the present invention provides the ability to select a subset of performance counter events from a performance object to be monitored and the ability to customize how or when the performance counter events are counted.

In one embodiment, the performance DLL is configured to monitor application-specific performance counters that describe the behavior of hardware systems developed by other engineers. The term "application-specific performance counter" is used to mean a metric that applies uniquely to a specific subsystem. For example, a specific graphics card may include a special feature that may provide especially good graphics performance. An appropriate application-specific performance counter for this graphics card would track the percentage of time the special feature was being used.

Figure 2:
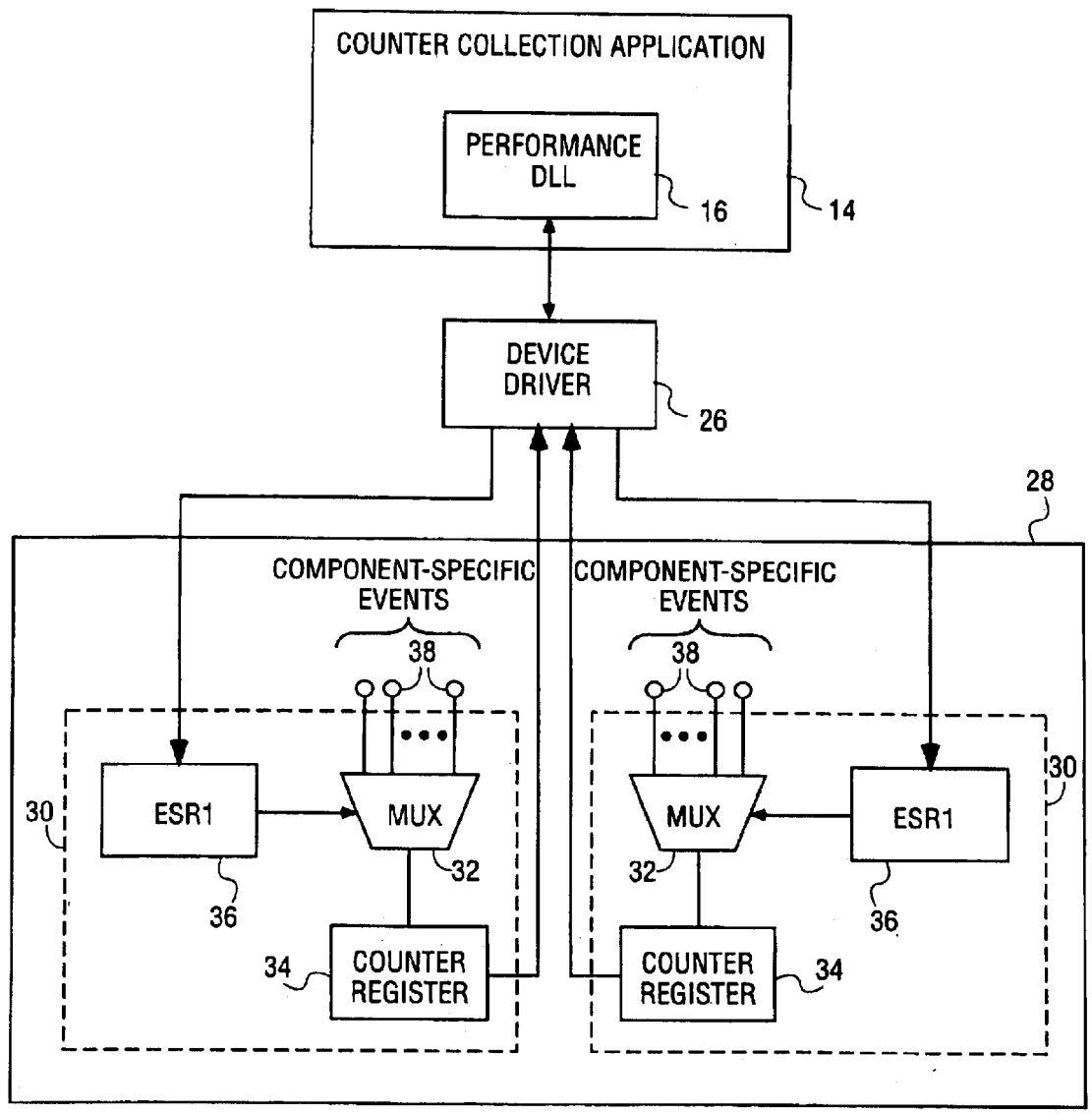
FIG. 2 is a block diagram of a hardware component having performance counters incorporated therein.

FIG. 2 shows one example of a hardware component (e.g., processor) 28 having programmable performance counters 30 incorporated therein. It should be understood by those skilled in the art that the programmable performance counters in FIG. 2, illustrated for the purpose of illustration, are only one of many different ways a performance counter could be implemented in hardware. The performance DLL 16 of the present invention is configured to communicate with performance counters 30 via a device driver 26. In the illustrated embodiment, two programmable performance counters 30 are shown; however any number of performance counters may be used (e.g., 3, 4, etc.).

Each programmable performance counter 30 generally includes a multiplexor 32, a counter register 34 and an event select register (ESR) 36. The multiplexor 32 has a number of inputs coupled to receive various component-specific event signals 38 and an output coupled to the counter register 34 for counting any one independent event selected from a predetermined list of component-specific events 38. The performance counter 30 is programmable to couple any one of the component-specific event signals 38 to the count register 34. This coupling of one of the inputs of the multiplexor 32 to the counter register 34 is controlled by the ESR 36. In one embodiment, the performance counter is programmed by instructions sent by the device driver. In this regard, the performance DLL 16 sends instructions to the device driver 26, which in turn instructs the ESR to select the component-specific event to be counted by the respective counter register. During data collection, the performance DLL can be used to read the content of the counter registers 34 via the device driver 26 to determine how many times the selected events have occurred.

In one embodiment, the performance DLL 16 is also configured to send instructions to the device driver, which in turn, programs the ESR 36 to customize the way in which the component-specific events 38 are counted. The ESR 36 may have bits that can be set and depending on how those bits are set, the performance counter is programmed to count a particular component-specific event only when the hardware component (e.g., processor) is operating at a certain mode or privilege level. In other words, the ESR 36 is capable of controlling the count operations of the counter register in addition to controlling the selection of the event to be counted. To illustrate one example of how the performance data collection may be customized, an Intel Pentium III processor may be programmed to count the number of L2 Cache misses. This collection can be customized to count the event (i.e., L2 Cache misses) when it occurs during operating system privilege level, during user privilege level, or during both operating system and user privilege levels.

As previously mentioned, the present invention defines a set of performance APIs. The performance APIs are functions in a performance DLL that are called by the CCA. In one embodiment, five performance APIs are employed, including an Open API, a Collect API, a Close API, a ProgramCounter API and a GetExtendedCounterName API. The Open API is called by the CCA when the performance DLL is first loaded. The Open API is intended to allow the performance DLL to initialize itself by going out to the computer system and finding the devices and/or software that it will be collecting performance data from. The Collect API gets called periodically during a collection session by the CCA to request performance data from the performance DLL which receives its performance data from performance registers in hardware components and/or variables in software. The Close API gets called by the CCA when the user exits the CCA and enables the performance DLL to free up memory that was allocated and close its connection to the external subsystem components.

The ProgramCounter and GetExtendedCounterName APIs provide the ability to selectively choose one or more performance counter events to be monitored simultaneously and customize the manner in which the data is collected. The ProgramCounter API gets called at different points during the execution of the CCA and serves various functions including: (1) adding a counter event to the current list of selected counter events; (2) removing a counter event from the current list of selected counter events; (3) programming a performance counter immediately before a collection session; (4) unprogramming the performance counter to stop collecting performance data at the end of the collection session; and (5) optionally generating a 64-bit custom collection modifier value used to custom-program a performance counter, which is also used by the GetExtendedCounterName API to generate a new name. In this regard, the ProgramCounter API enables the CCA to program a performance counter in a hardware component to track a particular event. The GetExtendedCounterName API is used to generate a new name for a performance counter event when the collection thereof has been customized. The new name generated by the GetExtendedCounterName is added to a captured data file. This ensures that when the data is examined later, the user understands how the counter event was counted (i.e., how the counter data should be interpreted) in addition to what counter event was collected.

During the configuration of a collection session, a user may choose to customize the collection of a performance counter event. For example, the user may want to specify that a particular event is to be counted only when the component (e.g., processor) is operating at certain privilege levels (e.g., operating system level or user level). When the user requests that the collection of a specific counter event be customized via some user interface action, the CCA calls the ProgramCounter API with a special flag that indicates customization of the counter has been requested. The performance DLL responds by displaying a dialog box, which illustrates the different ways the counter can be customized. The design of the dialog box is controlled by the performance DLL developer making its user interface extremely flexible. The customization dialog box may include descriptions of hardware or software components and subcomponents (e.g., gates and bits that can be set on an ESR). When the user makes his selection, the performance DLL returns a custom collection modifier (e.g., cookie) to the CCA, which saves it as part of its session configuration. The ProgramCounter API is also called immediately before a session is run to program the performance counter in the hardware to be monitored. If a custom collection modifier (e.g., cookie) had been generated as part of the session configuration earlier, the custom collection modifier is passed back to the performance DLL by the CCA and used by the ProgramCounter API to program the hardware component's performance counters.

When customization of a counter's collection is requested during a configuration session, the CCA 14 calls the associated performance DLL's GetExtendedCounterName API which returns a new name for the counter event based on the custom collection modifier. For example, suppose the user selected the L2 Cache Misses performance counter event in the Pentium III processor to be monitored. Also, suppose the user customized it to be monitored only when it occurred in the operating system privilege level (i.e., Ring 0). The CCA will call the GetExtendedCounterName API and request a new name for the counter event. The new name provided for the counter event may read something like L2 Cache Misses—Ring0. This new name will be saved in the file containing the data collected and also displayed in the performance monitoring system's 10 user interface 18. In this regard, even if the performance counter data is viewed much later (e.g., a month later), the new name serves to remind the user how the data had been collected.

Figure 3:
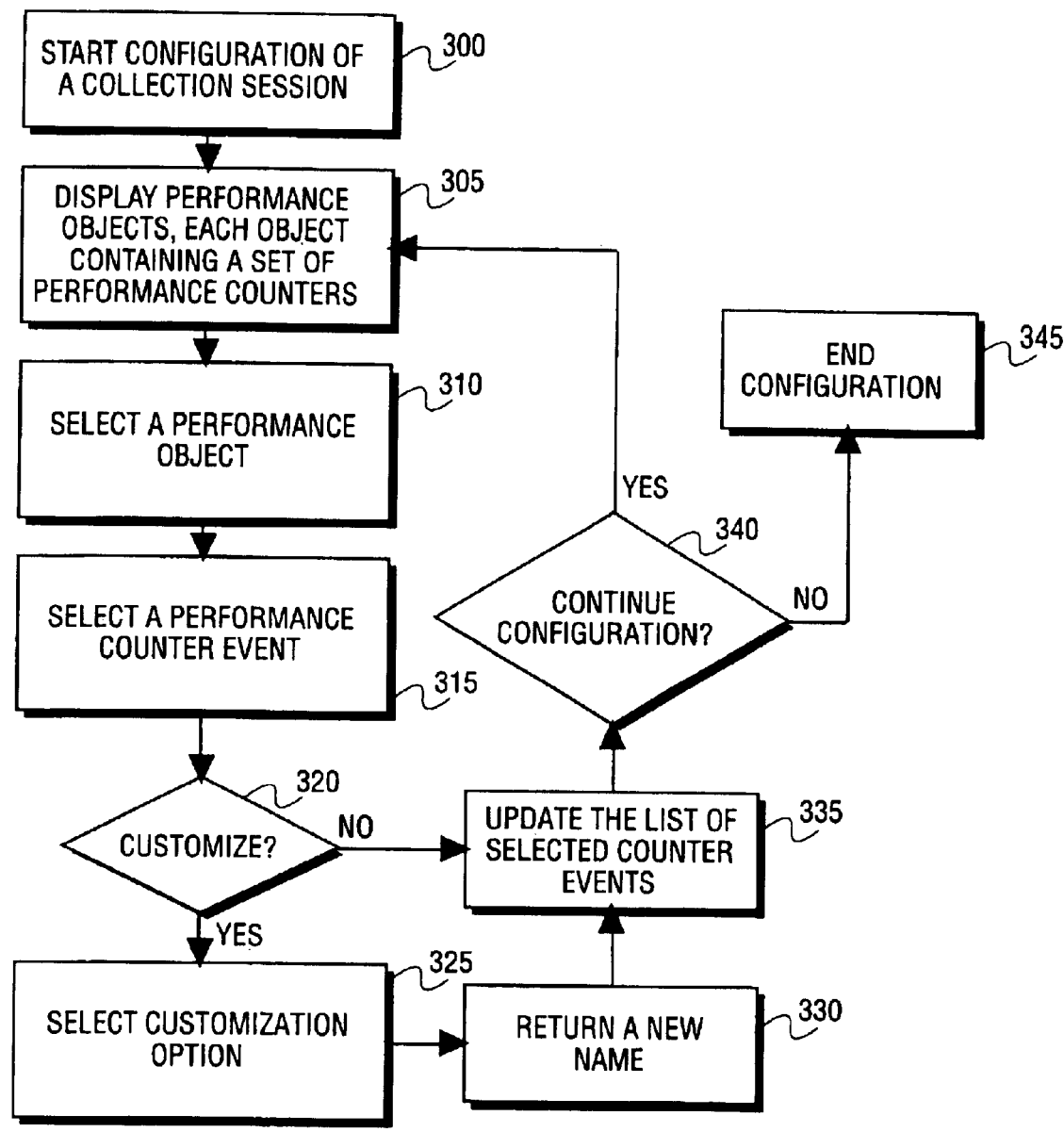
FIG. 3 is a flowchart of a performance counter configuration operation of a counter collection application according to one embodiment of the present invention.

Referring to FIG. 3, a flowchart of configuration operations of the counter collection application according to one embodiment of the present invention is shown. According to one aspect of the present invention, during the configuration of a collection session, a user is allowed to selectively choose a subset of counter events contained in one or more performance objects. In addition, the user may also configure when the counter event is incremented, allowing the collection of the performance data to be customized. When the CCA is started, it reads all of the counter event names and counter descriptions from the system registry. The CCA also loads all of the performance DLLs registered on the system. The CCA then calls each performance DLL's Open API. Then, the CCA calls each performance DLLs Collect API, setting a special flag that instructs the performance DLL to return all counters it can support along with the maximum number of counters it can collect at one time. The CCA parses this data and provides a list of performance objects and performance counters to the performance monitoring system's user interface. Turning now to FIG. 3, the configuration of a collection session starts in block 300. In functional block 305, the performance monitoring system's user interface displays a list of performance objects supported by each performance DLL loaded into the CCA. In functional block 310, the user may view a list of counter events associated with each object by clicking on the object. From the list of events displayed, the user may select an event to be monitored in functional block 315.

Once an event has been selected, the user has the option to customize the collection of the selected event in decision block 320. If the user decides to customize the collection (decision block 320, YES), the CCA calls ProgramCounter API and a customization dialog box is displayed with customization options associated with the selected counter event. Once the user selects one or more of customization options (functional block 325), ProgramCounter API returns a cookie to the CCA. In functional block 330, the CCA calls GetExtendedCounterName API and passes the cookie to the GetExtendedCounterName API, which returns a new name for the counter event based on the customization options selected. Then in functional block 335, the list of selected counter events is updated with the new name generated by the GetExtendedCounterName API. In decision block 340, if the user decides to continue the configuration (decision block 340, YES), the CCA returns to functional block 305. Otherwise (decision block 340, NO), the CCA terminates its configuration operations in block 345.

Figure 4:
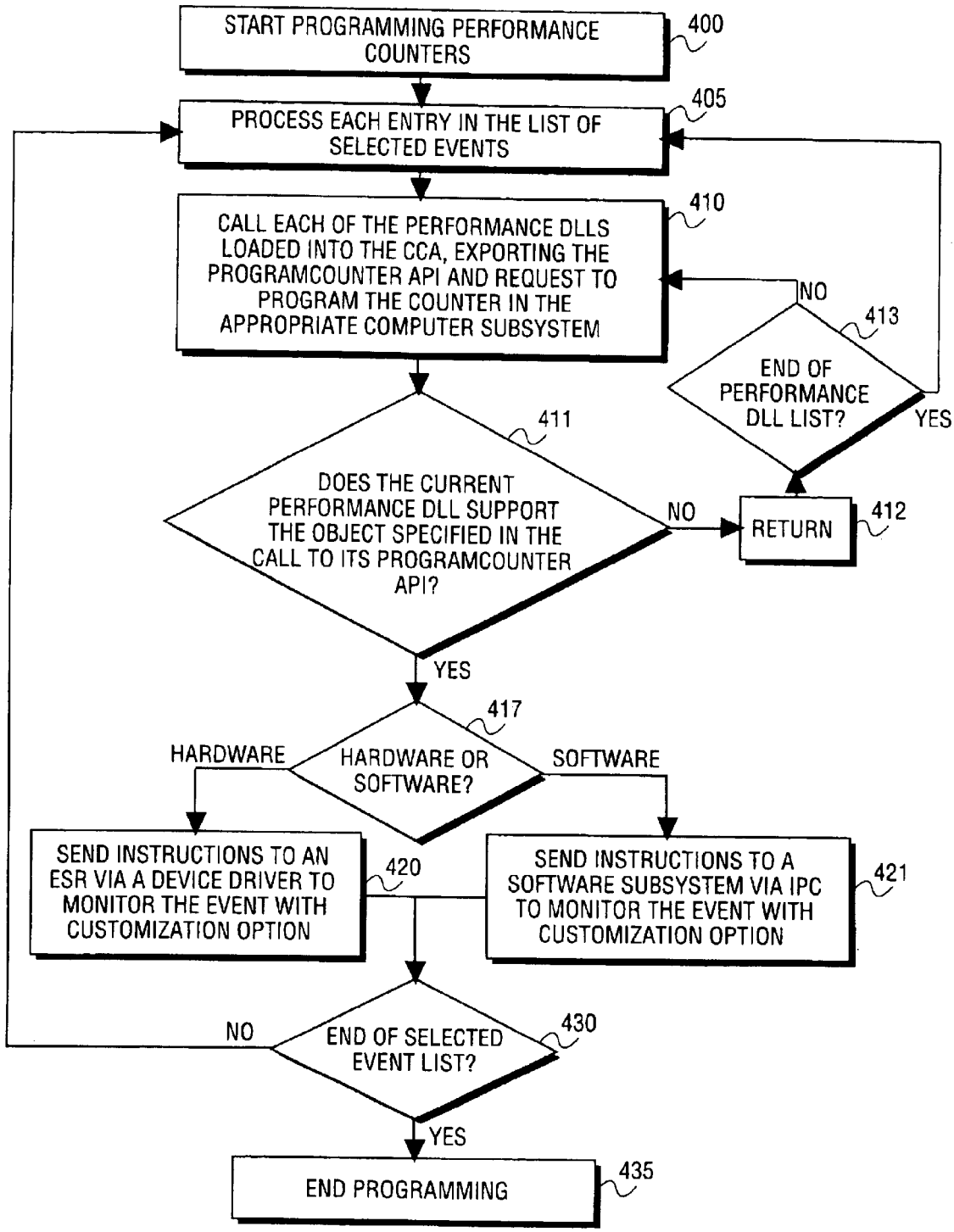
FIG. 4 is a flowchart of a performance counter programming operation of the counter collection application according to one embodiment of the present invention.

Referring to FIG. 4, a flowchart of programming operations of the counter collection application according to one embodiment of the present invention is shown. Once the user has configured a collection session, the user may start collecting performance counter data. However, before the data collection actually begins, performance counters associated with the selected events must be programmed in block 400. For each entry in the list of selected events, the CCA proceeds in a main-loop (blocks 405–430) to program a respective performance counter associated with the current entry. In one embodiment, each entry includes information about a particular event selected by the user such as an object index (to indicate a corresponding performance object), a counter index (to indicate a corresponding counter event) and a custom collection modifier (to indicate how or when the corresponding counter event is to be counted). Within the main-loop is a sub-loop (blocks 410–413) that finds which performance DLL, loaded into the CCA, supports the performance object associated with the current entry.

For each entry in the list of selected events, the sub-loop (blocks 410–413) examines each of the performance DLLs loaded (that exports the ProgramCounter API) sequentially. In this sub-loop, the CCA calls each performance DLL's ProgramCounter API with a flag which invokes a function in the ProgramCounter API to program the associated performance counter. If the current performance DLL supports the performance object specified in the call to the ProgramCounter API (decision block 411, YES), it programs the associated performance counter by proceeding to block 417. Otherwise, if the current performance DLL doesn't support the performance object specified in the call to the ProgramCounter API (decision block 411, NO), it simply returns (block 412) to the beginning of this sub-loop (block 410) where the next 4: performance DLL's ProgramCounter API is called. This sub-loop is continued until all of the loaded performance DLLs, exporting the ProgramCounter API, have been examined (decision block 413, YES).

Once a performance DLL supporting the current entry is identified, it is determined whether the associated performance counter resides in a hardware or a software program in decision block 417. In this regard, if the performance counter resides in a hardware component (decision block 417, HARDWARE), the performance DLL sends instructions to a device driver, which then sends commands down to the performance counter residing in the hardware component to count the occurrence of a particular counter event in functional block 420. Additionally, if the user has customized the collection of this particular counter event, the CCA passes back the custom collection modifier (e.g., cookie) it received earlier and the custom collection modifier is used by the ProgramCounter API to program a respective performance counter. Alternatively, if the performance counter resides in a software code (functional block 417, SOFTWARE), the performance DLL sends instructions to a software subsystem via an interprocess communication (IPC) to count the occurrence of a particular event. The loop (blocks 405–430) is continued until end of the list has been reached (decision block 430, NO) and terminates in block 435.

Figure 5:
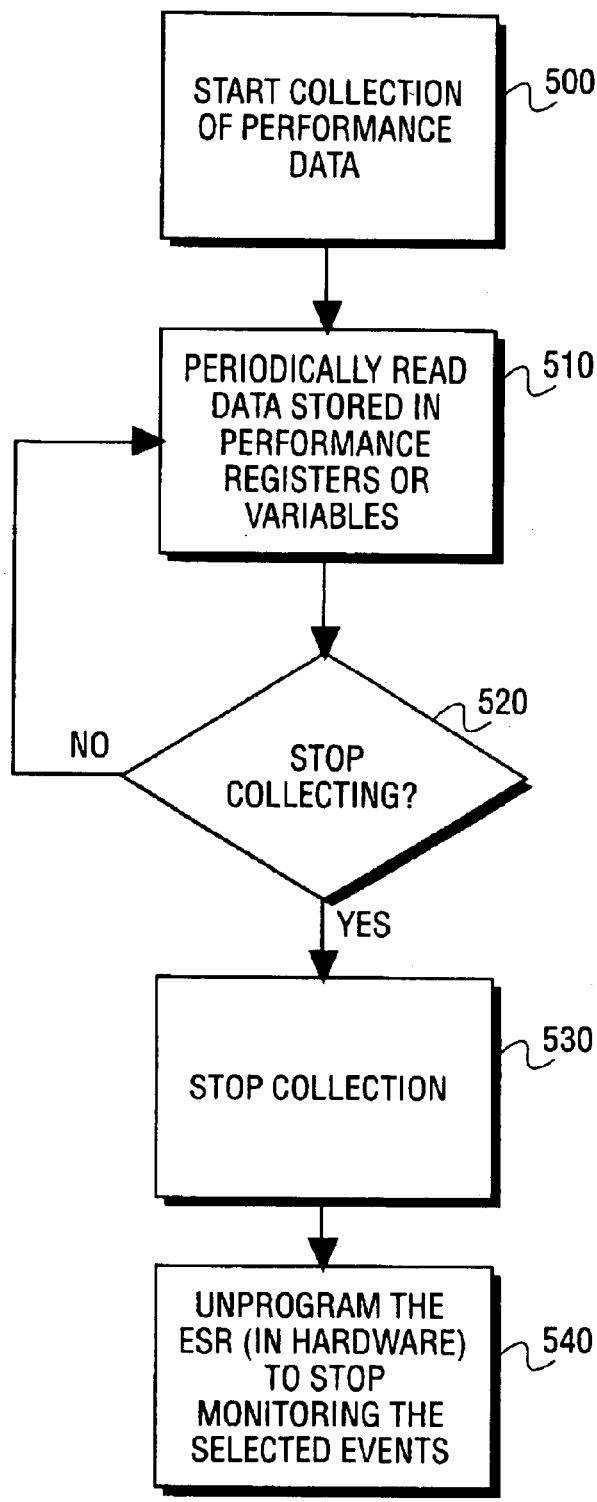
FIG. 5 is a flowchart of a performance data collection operation of the counter collection application according to one embodiment of the present invention.

Referring to FIG. 5, a flowchart of collection operations of the counter collection application according to one embodiment of the present invention is shown. Once the programming of the selected performance counters has been completed, the CCA is now ready to collect performance data in block 500. The CCA collects performance data while the computer system (e.g., PC) is actively executing user's test. During the performance data collection, the CCA periodically calls the Collect API of each performance DLL, passing in a list of performance objects to be collected along with a buffer. If the performance DLL supports one of the requested objects, it returns the structures for the performance counters selected in the buffer. In functional block 510, the performance DLL periodically reads data stored in performance registers and variables when its Collect API is called by the CCA and returns the data in the buffer. The functional block 510 is repeated until the user requests the CCA to stop collecting performance data. When the stop collection is requested (decision block 520, YES), the CCA stops calling Collect API and the performance data collection is terminated in block 530. Then in block 540, the CCA calls the ProgramCounter API for each counter event in the list, which deselects and unprograms the performance counters in the hardware components to stop monitoring those events.

The performance APIs provide a standard interface to programming a hardware component's performance counters. When an engineer develops a performance DLL for their hardware component, it allows the performance-monitoring system to track the hardware component's performance. It should be noted that the CCA of the present invention is capable of executing multiple performance DLLs simultaneously. Since the performance of multiple hardware components (e.g., processor, chipset, graphics card, network card, etc.), can be tracked at the same time by using multiple performance DLLs, the performance-monitoring system of the present invention is capable of monitoring the performance of the entire computer platform. When multiple hardware components are tracked at the same time, cause and effect relationships can be discovered between the different hardware components within the system. For example, suppose the graphics card waits while the processor is busy or vice versa. Using multiple performance DLLs in conjunction with the CCA can uncover such situations. In this regard, software developers can use the information provided by the CCA to modify their code to allow the processor and graphics card to work in parallel, which allows the system to be used more efficiently.

In accordance with one aspect of the present invention, the performance-monitoring system enables a user to select the entire set or a subset of counter events from a predetermined set of events contained in a performance object to be monitored. This provides the ability to cleanly collect counter event data from hardware components that have programmable performance counters. Moreover, the ability to customize the collection allows developers much greater flexibility in how a hardware component is programmed to monitor its performance counters. In this regard, because the present invention combines the ability to select a subset of counter events from a performance object and the ability to customize collection of those events into a performance-monitoring system that can concurrently collect data from multiple hardware components, the performance-monitoring system of the present invention is capable of effectively monitoring the performance of an entire computer system. This concurrent monitoring of various components is useful in illustrating previously unseen hardware bottlenecks in the system and allow hardware performance to be improved and/or allow software developers to develop code that utilizes the computer platform more efficiently.

In accordance with another aspect of the present invention, the performance DLL of the present invention may be configured to monitor performance counters that exist in software codes (e.g., user applications and operating system functions) as well as monitoring hardware performance counters. In this regard, the performance-monitoring system of the present invention may be used by software developers to test and optimize their applications to run effectively on a computer system. In software programs, performance counters (or counter events) may be implemented using variables. For example, a performance counter may be configured to count the throughput of bytes to and from a server application. In this case, a performance DLL may be developed to access content of the variable (i.e., information stored in a designated area of a computer system memory) via an interprocess communication (IPC).

In accordance with yet another aspect of the present invention, multiple performance DLLs may be developed to monitor a hardware component, an operating system function and software code simultaneously. By virtue of having this capability, the performance-monitoring system of the present invention is capable of illustrating the cause and effect relationships between various hardware components, operating system functions and user application operating within the computer system. Examination of the cause and effect relationship between various subsystem components including hardware, operating system and software is useful for identifying problems and bottlenecks in the system that are causing the system to slow down. By allowing users to selectively choose any combination of component-specific events to be monitored, the component-specific events can be chosen in such a way as to provide access to the interaction and dynamics between any subsystem components.

In one embodiment, the counter collection application of the present invention may be incorporated into VTune™ Performance Analyzer which is a performance-monitoring tool developed by Intel configured for optimizing applications to run efficiently on Intel Architecture based computers.

While the foregoing embodiments of the invention have been described and shown, it is understood that variations and modifications, such as those suggested and others within the spirit and scope of the invention, may occur to those skilled in the art to which the invention pertains. The scope of the present invention accordingly is to be defined as set forth in the appended claims.

What is claimed is:

1. A method comprising:
   providing at least one performance object containing a plurality of events;
   allowing a user to select a subset of events to be monitored during a collection session from said at least one performance object;
   programming performance counters associated with said subset of events selected to increment in response to an occurrence of a respective event; and
   periodically reading data stored in each of said performance counters associated with said selected subset of events during the collection session, wherein at least one of the performance counters associated with the selectable events is implemented using a hardware register and at least another one of the performance counters associated with the selectable events is implemented using a software variable, wherein a plurality of performance objects are supported by a performance dynamic link library (performance DLL).

2. The method of claim 1, wherein said subset of events selected by the user includes at least one of said plurality of events contained in said at least one performance object.

3. The method of claim 1, wherein said subset of events selected by the user includes all of said plurality of events contained in said at least one performance object.

4. The method of claim 1, wherein at least one of the events in the performance object has at least one customization option associated therewith; and said method further comprising allowing the user to customize performance data collection of said at least one of the events by selecting said at least one customization option associated therewith.

5. The method of claim 4, further comprising generating a new name for a selected event if collection thereof has been customized.

6. The method of claim 1, wherein said subset of events selected by the user includes at least one event associated with a hardware component and at least one event associated with a user application.

7. The method of claim 6, wherein said subset of events selected by the user further includes at least one event associated with an operating system function.

8. A machine readable medium that provides instructions, which when executed by a machine, cause said machine to perform operations comprising:

configuring a collection session by allowing a user to selectively choose a subset of events to be monitored during a collection session from a performance object containing a list of events;

programming performance counters associated with the subset of events selected by the user to count the occurrence of a respective event prior to the collection session; and reading data stored in the performance counters during the collection session, wherein at least one of the performance counters associated with the selectable events is implemented using a hardware register and at least another one of the performance counters associated with the selectable events is implemented using a software variable, wherein a plurality of performance objects are supported by a performance dynamic link library (performance DLL).

9. The medium of claim 8, wherein the operations further comprise displaying names and descriptions of each event associated with the performance object.

10. The medium of claim 8, wherein the configuring of the collection session further comprises allowing the user to configure when the respective performance counter is incremented.

11. The medium of claim 8, wherein the programming of the performance counters is accomplished by the performance dynamic link library (performance DLL) which sends commands to a respective performance counter residing in a hardware component via a respective device driver to count the occurrence of a respective event.

12. The medium of claim 8, wherein said subset of events selected by the user includes at least one event associated with a hardware component and at least one event associated with a user application.

13. The medium of claim 12, wherein said subset of events selected by the user further includes at least one event associated with an operating system.

14. A system comprising:

a plurality of performance counters, each of said performance counters associated with a respective subsystem component of a computer system, each of said performance counter coupled to receive a plurality of event signals generated within the respective subsystem component, wherein at least one of said performance counters includes a hardware register and a controller to selectively couple one of the event signals to the hardware register to increment the hardware register, wherein at least another one of said performance counters is implemented using a software variable;

an application in communication with at least one of said performance counters, said application to program the controller of said at least one of said performance counters to enable one of the event signals coupled thereto to increment the register thereof in response to an occurrence of a selected event, said application to periodically read data stored in the register of said at least one of said performance counters while the computer system is executing instructions, wherein the application to enable a user to selectively choose a subset of events to be monitored during a collection session from a performance object containing a list of events; and at least one performance dynamic link library (performance DLL) which is loaded when the application is executed, said performance DLL serving as a bridge between the application and performance counters that reside in the computer system.

15. The system of claim 14, wherein the application is capable of executing a number of performance DLLs to allow monitoring of a plurality of subsystem components simultaneously within the computer system.

16. The system of claim 15, wherein said plurality of subsystem components simultaneously monitored include at least one hardware component, at least one user application and at least one operating system function.

17. The system of claim 15, wherein the performance DLL is derived from a set of performance application programming interfaces (Performance APIs).

18. The system of claim 17, wherein the set of performance APIs includes an interface which serves to program the performance counter prior to the collection session to enable one of the event signals coupled to the performance counter to increment the register in response to an occurrence of the selected event.

19. The system of claim 17, wherein the set of performance APIs includes an interface which serves to generate a new name for a particular event if collection thereof has been customized.

20. The method of claim 4, wherein the allowing the user to customize performance data collection of said at least one of the events comprises programming at least one of the performance counters associated with said at least one of the customized events to increment only when said at least one of the customized events occurs during a operating system privilege level.

21. The method of claim 4, wherein the allowing the user to customize performance data collection of said at least one of the events comprises programming at least one of the performance counters associated with said at least one of the customized events to increment only when said at least one of the customized events occurs during a user privilege level.

22. The system of claim 14, wherein the application to enable the user to customize performance data collection of a particular event by programming a performance counter associated with the particular event to increment only when the particular event occurs during a operating system privilege level.

23. The system of claim 14, wherein the application to enable the user to customize performance data collection of a particular event by programming a performance counter associated with the particular event to increment only when the particular event occurs during a user privilege level.

* * * * *

UNITED STATES PATENT AND TRADEMARK OFFICE
CERTIFICATE OF CORRECTION

PATENT NO. : 6,792,392 B1
DATED : September 14, 2004
INVENTOR(S) : Knight

It is certified that error appears in the above-identified patent and that said Letters Patent is hereby corrected as shown below:

<u>Column 6,</u>
Line 47, after "next", delete "4".

Signed and Sealed this

Thirty-first Day of May, 2005

JON W. DUDAS
*Director of the United States Patent and Trademark Office*